(12) United States Patent
Aggarwal et al.

(10) Patent No.: US 11,379,384 B2
(45) Date of Patent: Jul. 5, 2022

(54) OBLIVIOUS FILTERING OF DATA STREAMS

(71) Applicant: Visa International Service Association, San Francisco, CA (US)

(72) Inventors: Abhinav Aggarwal, Palo Alto, CA (US); Rohit Sinha, San Jose, CA (US); Mihai Christodorescu, San Jose, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 17/280,159

(22) PCT Filed: Sep. 27, 2019

(86) PCT No.: PCT/US2019/053640
§ 371 (c)(1),
(2) Date: Mar. 25, 2021

(87) PCT Pub. No.: WO2020/069431
PCT Pub. Date: Apr. 2, 2020

(65) Prior Publication Data
US 2022/0004507 A1 Jan. 6, 2022

Related U.S. Application Data

(60) Provisional application No. 62/738,752, filed on Sep. 28, 2018.

(51) Int. Cl.
*G06F 12/14* (2006.01)
*G06F 12/0891* (2016.01)
*G06F 21/78* (2013.01)

(52) U.S. Cl.
CPC ...... *G06F 12/1408* (2013.01); *G06F 12/0891* (2013.01); *G06F 12/1425* (2013.01); *G06F 21/78* (2013.01)

(58) Field of Classification Search
CPC ...... G06F 21/72; G06F 21/55; G06F 12/1408; G06F 21/53; G06F 21/78; G06F 12/0891; G06F 12/1425; G06F 12/14
See application file for complete search history.

(56) References Cited

U.S. PATENT DOCUMENTS 9,015,853 B2 * 4/2015 Stefanov ............. G06F 21/6254
713/181
10,664,399 B2 * 5/2020 Persson ............... G06F 13/1668
(Continued)

FOREIGN PATENT DOCUMENTS

KR 10-20140074806 A 6/2014

OTHER PUBLICATIONS

H. Park, C. Kim, S. Yoo and C. Park, "Filtering dirty data in DRAM to reduce PRAM writes," 2015 IFIP/IEEE International Conference on Very Large Scale Integration (VLSI-SoC), 2015, pp. 319-324.*
(Continued)

*Primary Examiner* — Pierre Michel Bataille
(74) *Attorney, Agent, or Firm* — Kilpatrick Townsend & Stockton LLP

(57) ABSTRACT

A technique for oblivious filtering may include receiving an input data stream having a plurality of input elements. For each of the input elements received, a determination is made as to whether the input element satisfies a filtering condition. For each of the input elements received that satisfies the filtering condition, a write operation is performed to store the input element in a memory subsystem. For those of the input elements received that do not satisfy the filtering condition, at least a dummy write operation is performed on the memory subsystem. The contents of the memory subsystem can be evicted to an output data stream when the memory subsystem is full. The memory subsystem may include a trusted memory and an unprotected memory.

20 Claims, 6 Drawing Sheets

(56) References Cited

U.S. PATENT DOCUMENTS

| | | |
|---|---|---|
| 2010/0192045 A1 | 7/2010 | Park et al. |
| 2011/0060996 A1* | 3/2011 | Alberth, Jr. .......... H04L 67/306 |
| | | 715/736 |
| 2014/0281512 A1 | 9/2014 | Arusu et al. |
| 2016/0103626 A1 | 4/2016 | Hars et al. |

OTHER PUBLICATIONS

Abhinav Aggarwal et al., "Oblivious Filtering on Data Streams", UNM CS Colloquium, Albuquerque, pp. 1-24, Aug. 2018, [retrieved on Jan. 3, 2020], Retrieved from https://abhiaq6891.files.wordpress.com/2018/08/talk.pdf, pp. 11, 16, 22.

PCT Application No. PCT/US2019/053640, International Search Report and Written Opinion dated Jan. 15, 2020, 9 pages.

* cited by examiner

OBLIVIOUS FILTERING OF DATA STREAMS

CROSS-REFERENCES TO RELATED APPLICATIONS

The present application is a 371 application of International Application No. PCT/US2019/053640, filed Sep. 27, 2019, entitled "OBLIVIOUS FILTERING OF DATA STREAMS", which claims the benefit of U.S. Provisional Application No. 62/738,752 entitled "OBLIVIOUS FILTERING OF DATA STREAMS" filed on Sep. 28, 2018, the entire content of which is hereby incorporated by reference for all purposes.

BACKGROUND

Application developers are increasingly relying on shared cloud infrastructure for hosting and processing databases, often containing sensitive user data. Even in tightly regulated industries such as healthcare and finance, production databases are typically hosted in silos guarded by weak defenses such as firewalls (for network isolation), monitoring tools, and role-based access control. This puts the sensitive data at risk for breaches due to a host of reasons including vulnerabilities in the application's software stack, privilege escalation bugs in cloud's infrastructure software, insufficient access control, firewall misconfigurations, and rogue administrators. While typical guidelines call for encryption of data at rest (e.g., using authenticated encryption) and in transit (e.g., using transport layer security (TLS)), such techniques are insufficient for guaranteeing privacy against the aforementioned threats, as they do not protect data while in use.

Recent advancements in trusted computing processor architectures have enabled hardware-isolated execution at native processor speeds while protecting data in use. However, since applications running within hardware enclaves interact with the host platform or with external interfaces to access resources and perform I/O operations, even isolation execution environments can be exposed to side channel observations such as access patterns, network traffic patterns, and timing of outputs, etc. Such side channel observations may allow an attacker to recover information about the user of the applications using statistical inference. For example, even on an ideal trusted execution environment, an attacker may still observe cache timing and hyper-threading leakages. As encrypted databases are increasingly developed and deployed commercially, mitigations for such channels become increasingly paramount.

Embodiments of the present disclosure address these and other problems individually and collectively.

DETAILED DESCRIPTION

Figure 1:
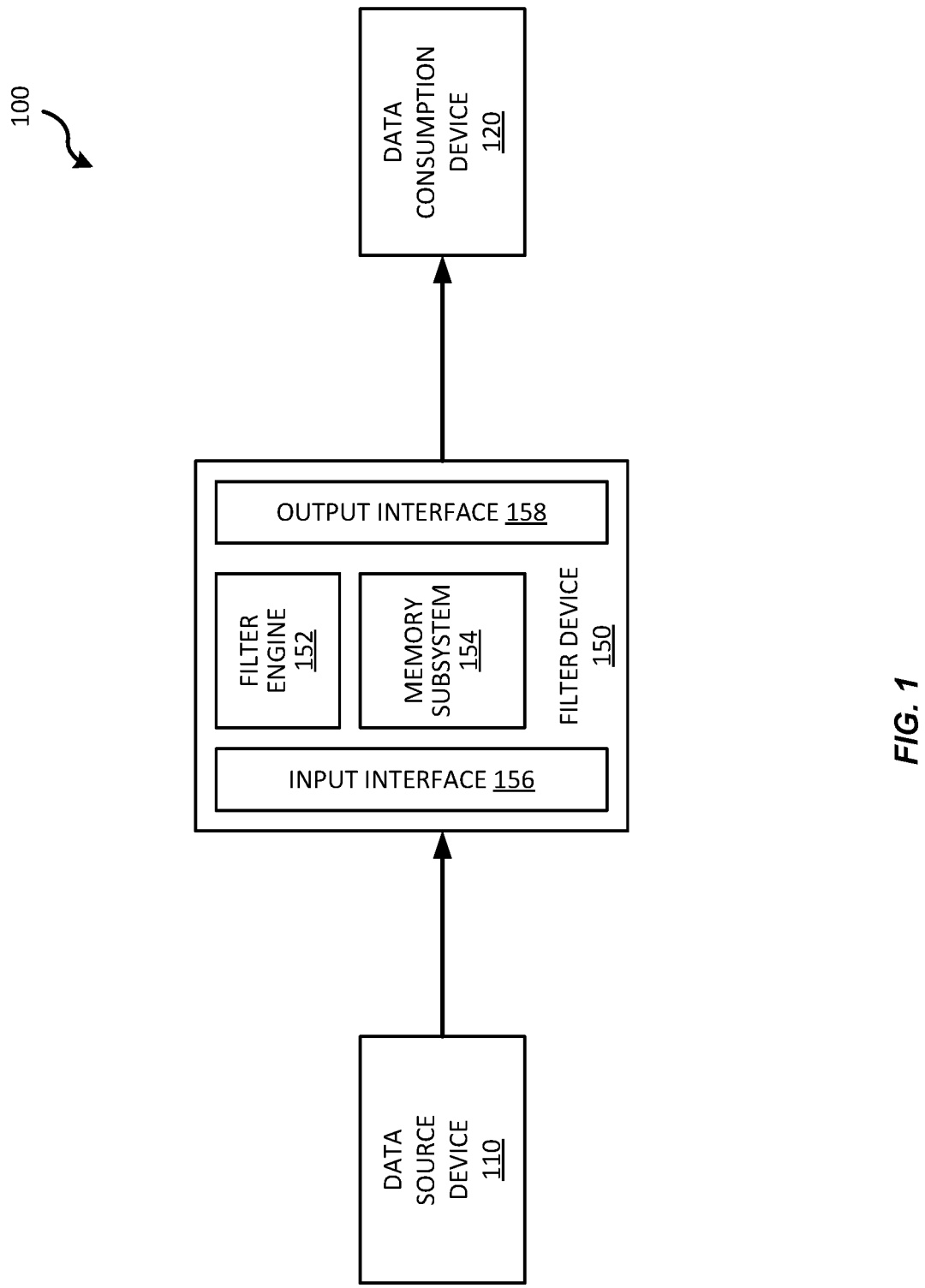
FIG. 1 shows a block diagram of a system, according to some embodiments.

A side channel attack may refer to a cybersecurity threat in which an unauthorized entity is able to observe data access patterns and infer certain information about the data consumer from analysis of the data access patterns. Encryption of the underlying data may mitigate an attacker from obtaining the underlying data, but encryption itself does little to protect against side channel attacks, because such attacks rely on the data access patterns and not necessarily on the underlying data. In the context of a data filtering system, an attacker may be able to observe at what point in time does an input data stream passes the filter. This information may allow the attacker to infer certain user information such as user preferences, interests, access timing and frequency, etc. Accordingly, the techniques described herein provide an oblivious filtering system to mitigate against such side channel attacks by obfuscating the results of the data filtering system.

Prior to discussing embodiments of the invention, some terms can be described in further detail.

A computing device may be a device that includes one or more electronic components (e.g., an integrated chip) that can process data and/or communicate with another device. A computing device may provide remote communication capabilities to a network, and can be configured to transmit and receive data or communications to and from other devices. Examples of a computing device may include a computer, portable computing devices (e.g., laptop, netbook, ultrabook, etc.), a mobile device such as a mobile phone (e.g., smart phone, cellular phone, etc.), tablets, portable media player, personal digital assistant devices (PDAs), wearable computing device (e.g., smart watch), electronic reader device, etc. A computing device may also be in the form of an Internet of Things (IoT) device, or a vehicle (e.g., an automobile such as a network connected car) equipped with communication and/or network connectivity capabilities.

A server computer or processing server may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client devices.

A key may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include Advance Encryption Standard (AES), Data Encryption Standard (DES), Triple Data Encryption Standard/Algorithm (TDES/TDEA), or other suitable algorithms. The key used in the cryptographic algorithm can be of any suitable lengths (e.g., 56-bit, 128-bit, 169-bit, 192-bit, 256-bit, etc.). In some implementations, a longer key length may provide a more secure encryption that is less susceptible to hacking.

A trusted memory may refer to a memory that has tamper resistant features to protect the memory and/or its contents. The memory can be implemented using DRAM, SRAM, flash, or other suitable memories or storage medium. The tamper resistant features can be implemented using hardware, software, or a combination of both. Examples of tamper resistant features may include sensors for sensing abnormal temperature, voltage, electric current, etc., on-chip encryption/decryption capabilities, on-chip authentication, back-up power source (e.g., battery), tamper-triggered auto-erase feature, internal data shuffling feature, etc. The memory portion of the trusted memory can be implemented using DRAM, SRAM, flash, or other suitable memories or storage medium. A trusted memory may typically have a lower density and higher cost as compared to standard memories.

An unprotected memory may refer to a device that is capable of storing data. An unprotected memory may lack any special features to protect the memory or its contents. An unprotected memory can be implemented using DRAM, SRAM, flash, or other suitable memories or storage medium. As compared to a trusted memory, an unprotected memory may typically have a higher density and lower cost.

An oblivious random access memory (ORAM) may refer to a memory system that is capable of masking memory access patterns. For example, an ORAM may employ continuous reshuffling and re-encryption of the data content as they are being accessed to obfuscate which data element is being accessed at which time. An ORAM may employ symmetric encryption or homomorphic encryption.

FIG. 1 illustrates a block diagram of a data filtering system 100, according to some embodiments. System 100 may include a data source device 110, a data consumption device 120, and a data filter device 150. Data source device 110 may include a data storage or processing device that provides data streams to data consumers. Data source device 110 can be implemented using a server computer, or other types of computing device that can service data requests from data consumers. Examples of data source device 110 may include a database system that stores and provides database entries in response to queries, a content server that provides streaming content, a network enabled device that provides network packets, etc. When data source device 110 receives data requests from data consumption device 120, data source device may respond by obtaining the requested data from a data store, and provides a data stream containing the requested data to the data consumption device 120.

Data consumption device 120 can be a device that consumes or uses data obtained from a data source. Data consumption device 120 can be implemented as a client computing device, or other types of computing or communication device that provides data or information to an end user. Examples of data consumption device 120 may include a user computer, a portable communication device such as a smart phone, an Internet-of-things (IoT) device, a media device such as a television, display, and/or speaker, etc. Data consumption device 120 may send requests for data to data source device 110, receives a data stream corresponding to the requested data, and presents or otherwise makes available the requested data to an end user. In some implementations, data consumption device 120 can also process the data received from the data source, and provide the processed data to another device for consumption.

Data filter device 150 can be a device that receives an input data stream and provides an output data stream derived from the input data stream. In some embodiments, data filter device 150 can be a standalone device that is communicatively coupled between data source device 110 and data consumption device 120. For example, data filter device 150 can be network equipment such as a router coupled between a networked data source and a client computer. As another example, data filter device 150 can be a set-top box coupled between a media source and a display device. In some embodiments, data filter device 150 can be integrated as part of data source device 110 or data consumption device 120. For example, data filter device 150 can be implemented as a content filter at a content server, or as a firewall at a client device.

Data filter device 150 may include a filter engine 152, a memory system 154, an input interface 156 and an output interface 158. In implementations in which data filter device 150 is a standalone device, input interface 156 and output interface 158 can be a physical interface that provides wired or wireless connectivity to external devices. Examples of such physical interface may include a data I/O port, electrical contacts, an antenna and/or transceiver, etc. In implementations in which data filter device 150 is integrated into the data source or data consumption device, one or both of input interface 156 and an output interface 158 can be an application programming interface (API) that interfaces with a software component such as an application, an operating system, etc.

Filter engine 152 is communicatively coupled between input interface 156 and output interface 158. Filter engine 152 can be implemented using software, hardware, or a combination of both, and may perform a filtering function on the input data stream received on input interface 156, and provides an output data stream on output interface 158. For example, the input data stream may include a series of data input elements (e.g., data frames, network packets, database entries, etc.), and filter engine 152 may process each data input element to determine if the data input element satisfies a filtering condition. If the data input element satisfies the filtering condition, filter engine 152 may output the data input element on the output data stream. In some implementations, filter engine 152 may parse the data input element, and/or perform logic or computational operations on the data input element to determine if the data input element satisfies the filtering condition. If the data input element satisfies the filtering condition, filter engine 152 may provide the data input element unchanged to the output data stream, or filter engine 152 may modify the data input element before providing it to the output data stream.

In some scenarios, it may be possible that every data input element of the input data stream satisfies the filtering condition. In other scenarios, the output data stream may contain only a subset of the input data elements, because some of the data input elements failed the filtering condition. Examples of a filtering condition may include determining if a network packet is intended for a particular destination, if a database entry satisfies a database query, if one or more parameters of the input data satisfy certain thresholds, if an integrity check of the input data element verifies that the input data element has no errors, if a user is authorized to access the data input element, etc. In some embodiments, the filtering condition can be programmable or configurable. In some embodiments, the filtering condition can be hard-coded.

Filter engine 152 may utilize a memory subsystem 154 while performing the filtering function. For example, memory system 154 can be used as a buffer to temporarily store processed data input elements before providing the data input elements to the output data stream. Memory subsystem 154 can be implemented using DRAM, SRAM, flash, or other suitable memories or combinations thereof, and may include a trusted memory (may also be referred to as a secure memory), an unprotected memory, or a combination of both. A trusted memory may include tamper-resistant features to protect the contents of the memory, whereas an unprotected memory may lack such tamper-resistant features. As such, an unprotected memory can be vulnerable to attacks that may scan or read the contents of the memory. However, as compared to trusted memories, an unprotected memory may cost less and can be available in much higher densities. Various memory eviction techniques on how data from the memory is read out can be implemented to achieve oblivious filtering to mitigate against an attacker from inferring which data input elements passes the filtering condition. These techniques will be discussed further below.

To assess the effectiveness of oblivious filtering, a threat model was considered where a database application is compromised and the attacker makes fine-grained observations of its memory (both contents and access patterns), with the assumption that enclave memory cannot be observed. In this threat model, the attacker uses fine-grained observation of the memory region containing the output table to infer which records passed the filter. Certain schemes for oblivious filtering may include using oblivious sorting, using an enclave to perform several passes over the input database while outputting a constant number of matched records in each pass, etc. However, these schemes may not be applicable to streaming databases nor large databases that do not fit entirely in memory, and may also suffer from performance overheads (e.g., due to oblivious sorting or multiple passes).

In today's highly data-driven world, computing on encrypted databases while hiding access patterns and related side-channels from an eavesdropping adversary may be necessary to provide the required privacy and security guarantees. While many solutions exist in the offline setting (entire database needs to be accessed), it is not entirely clear if these results can directly extend to the online setting where look ahead is not allowed, while preserving similar guarantees. The techniques disclosed herein can be used in an online setting, where only a single pass over the entire database or the incoming data stream may be allowed. For a memory of size b, a lower bound on the information leakage of oblivious filtering operations can be established as $\Omega(\log b/b)$ bits of information per input element. While some solutions assume that the memory used by the system runs inside an (expensive) trusted execution environments, the use of an ORAM (oblivious random access memory) can help reduce the size of trusted memory by carefully accessing unprotected memory.

In accordance with the techniques disclosed herein, when the size $\tau$ of input elements is more than log the size M of the unprotected memory, only a trusted memory of a size being at most $$3\tau + \log\frac{M}{\tau} \ll M$$

may be needed. If w-window order preservation (order preservation across windows but not necessarily within) is allowed, then only a trusted memory of a size being at most $$3\tau + \log\frac{M}{w\tau}$$

may be needed. This implies that for a data stream containing a million positive elements of 1 Mb size each, the trusted memory can be reduced from 1 Tb (as used to store all elements in the trusted memory) to about 3 Mb, which is about 6 orders of magnitude smaller. Combining this with the unit reduction in delay for every unit reduction in the buffer size, this can provide almost $10^5$ times faster outputs.

Overview of Oblivious Filtering

Figure 2:
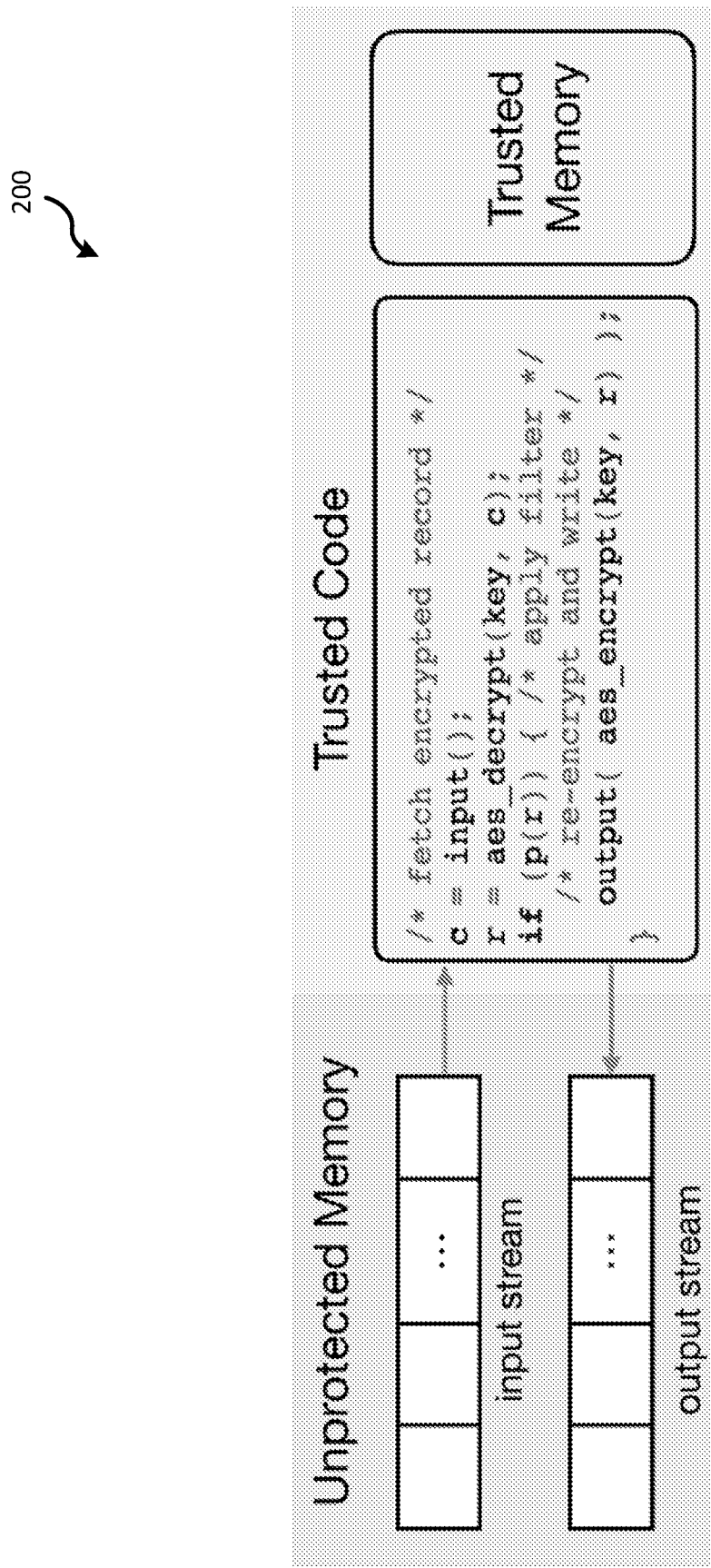
FIG. 2 shows an example of filtering encrypted data streams, according to some embodiments.

This section introduces the concept of oblivious filtering. FIG. 2 illustrates a system 200 containing a trusted module performing the filtering, and unprotected memory storing the input and output data streams, which may be either finite or infinite, depending on the application. The trusted module may implement the filter operation, and acts as a component of an encrypted database engine, which may have similar components for other operators. System 200 can be configured to use a trusted memory buffer of a parameterized length to reduce timing leaks. In this implementation, both the code and the memory buffer can be hosted within an enclave.

Consistent with the enclave threat model, it can be assumed that the attacker cannot observe the contents or the access patterns to the trusted memory, and cannot tamper with the trusted code implementing the filtering algorithm. While this assumption may hold for certain platforms such as the Sanctum enclave, oblivious memory techniques can be used to hide access patterns to trusted memory in the SGX-based library implementation. On the other hand, the attacker may be capable of full observation of access patterns and contents of unprotected memory; in other words, the attacker may observe the timing of each input consumption and output production at a fine-grained clock granularity.

The input and output streams can be encrypted under a symmetric key known to the client, and provisioned by the client to the trusted module (e.g., sent over an authenticated channel established using remote attestation). The goal of oblivious filtering is to hide which records from the input stream matched the filter, which would leak some information about the plaintext input. In a vulnerable implementation, the trusted module iterates over the entire input stream, fetching one record at a time, and produces each matched record in the output stream. To prevent obvious attacks, the trusted module may re-encrypt the matched record before writing to unprotected memory. However, this alone is insufficient, as the attacker simply needs to check whether an output was produced during the time duration between consecutive inputs.

Oblivious filtering can be used to prevent a (polynomial time) adversary from creating a correlation between the inputs and outputs, in that the attacker may only be able to learn the size of the output stream and nothing more. The filter can temporarily store matched records in the trusted memory buffer, and evict items based on a technique which minimizes leakage while respecting constraints such as buffer size and order preservation.

Data Streaming and Information Leakage

The input to the system can be a data stream, where each element of which have include some (encrypted) content and a timestamp associated with it. In some embodiments, the timestamp of the data input element need not be considered as part of the content. Rather, it can be assumed that timestamps are publicly readable attributes that are immutable (or cannot be modified). The encrypted content is hidden from the adversary. A collision-resistant secure encryption scheme can be employed so that: (1) it may be impossible to decrypt the content without the knowledge of the key; and (2) it may not be possible to produce two different content with the same encryption. It can be assumed that the key for this encryption (and decryption) is not available to the adversary and is known only to the system. It should be noted that in some embodiments, the encryption scheme may not necessarily support applying the filter to the encrypted content to infer the output that would have been obtained had the filter been applied to plaintext content.

In some implementations, the data input elements can arrive in order and in discrete units of time. The clock can be modeled to advance with these input arrivals so that the system may only produce an output when an input arrives. This may be referred to as the event-driven model for streaming. This model can be used to ensure that the adversary does not control the input arrival times and that the adversary cannot pause the input stream or delay these elements in order to observe the output for the elements currently in the buffer. The techniques disclosed herein may be used for an infinite stream, or for the finite stream setting, in which case the event-driven nature can be enforced by appending the last input element with an untamperable stop symbol and ensuring that the system eventually outputs the elements in the buffer once this symbol is encountered.

The filtering task can deal with queries that check if a given predicate holds true given the content of an element. Such queries may use the values of the content attributes to compute some predicate, the output of which determines if the given element satisfies the query or not. The solutions, described herein, can support arbitrarily complex predicate queries, as long as they are not functions of the timestamp of the incoming source elements and may not require other elements of the stream to be computed (i.e., the output of the query on an element can be computed entirely using the contents of this element). An input element can be said to match the filter (or is a positive element) if the query deployed by the filter returns true when run on the contents of the element. All other elements can be said to be negative.

The system may produce an output stream containing elements that are re-encrypted after the system has processed them and have a time stamp associated with them. Note that since the system has access to the key for the encryption/decryption algorithm, the computation of the query can be done on the decrypted content and the output produced can be re-encrypted using fresh randomness before being released onto the output stream. The output of computing a query on an element decides whether the element will appear in the output stream or not—the ones that do not match can be dropped by the system. It can be assumed that this computation is instantaneous compared to the time between successive input arrivals so that the output (if at all) can be produced immediately after the input is seen (if the algorithm specifies so).

In some embodiments, the filtering algorithm may have one or more of the following properties for the output stream:

Liveness—Every input element that matches the query is eventually output by the system. This can ensure a steady output stream and prevent the system from holding any input in its buffer indefinitely. This property also helps in characterizing the latency of the filtering algorithm.

Order Preservation—The output stream preserves the relative order of matched elements in the input stream. This can maintain the integrity of the output stream, especially for applications that are sensitive to the order in which elements arrive.

Type Consistency—The system may only output valid elements that match the filter. This property may ensure that no extra layers of (non-trivial) filtering are used on the outputs that the system produces.

For the purpose of the analysis described herein, multiple (or no) elements are allowed to be produced as output at a given time, unlike the input stream. This may be similar to the model in which at most one output is produced in each time step, because one can flatten the output stream containing multiple outputs by producing one output at a time using a buffer that is at most twice the size. This may not affect the asymptotic expected information leakage to the adversary.

For the execution of the filter, the system can have access to a trusted memory module, which will also be referred to as the buffer, that, at any point of time, can store up to b elements. The system can use this buffer to store elements before it outputs them (at which point the element is removed from the buffer). The size of this buffer is specified by the algorithm deployed and is assumed to be known to the adversary. However, the contents of this buffer and its access patterns may be hidden from the adversary at all times. In other words, it can be assumed that the trusted memory module is side-channel secure, so that the adversary is unable to use any information besides the knowledge of the algorithm, the buffer size and the timestamps on the input and the observed output stream to obtain information about the contents or the access patterns to the buffer. Since such trusted memory modules can be expensive to scale, it may be desirable to keep the memory buffer size as small as possible. The techniques disclosed herein provides a system that can utilize unprotected memory in conjunction with a much smaller trusted module to offer similar privacy guarantees.

Figure 3:
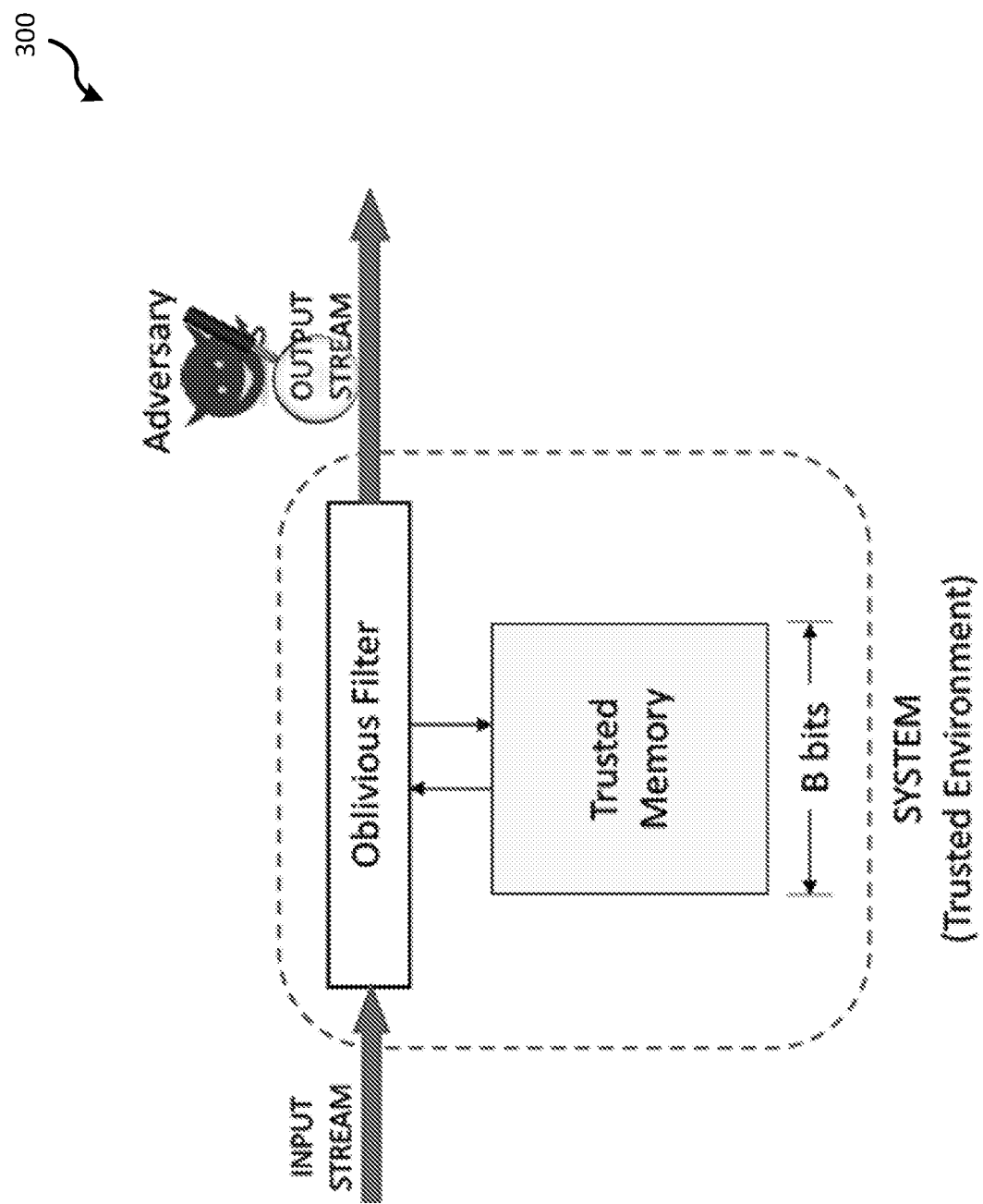
FIG. 3 shows a system model for oblivious filtering, according to some embodiments.

The adversary can be assumed to be a computationally bounded adversary whose aim is to determine what input elements match the query given its real time observation of the output stream produced by the system and complete knowledge of the query, the algorithm and the buffer size being deployed as shown in FIG. 3. It can be assumed that the adversary may not be able to observe the contents and the access patterns of the trusted module/memory (buffer) at any point, and neither control the private coin flips of the algorithm (if any). Furthermore, it can be assumed that the adversary cannot control the input stream (or the inter arrival times of positive elements), and cannot inject any elements that were not present in the original stream. It can also be assumed that the adversary may not be able to decrypt the contents of any element for both the input and output stream. Moreover, the system takes care to re-encrypt the positive elements before producing them into the output stream so that the adversary may not make any obvious correlations between the two streams, except what is revealed by the timestamps. Unless otherwise specified, the adversary's knowledge of the query can be assumed to allow some prior joint distribution a over the inputs so that $\sigma_t$ will provide an a priori likelihood that the element input at time t is positive, as believed by the adversary. In some embodiments, it is not assumed that the input stream is actually sampled from the distribution $\sigma$. The adversary's belief in this case is independent of the actual source of the input stream.

Referring to FIG. 3, upon observing an output stream for some number of time steps and with knowledge of the algorithm deployed by the system, the adversary may try to infer what inputs may have matched the given data filter. In some embodiments, the system aims to make the true input stream as indistinguishable as possible within the set of all such possibilities.

Oblivious Stream-Filtering

Let $\mathcal{I}$ be the set of all possible input elements. An algorithm (or scheme) $\mathcal{A}_{Q,b}: \mathcal{I} \to (\{\bot\} \cup 2^{\mathcal{I}}) \times \mathbb{N}$ can be said to filter the input stream with respect to a query Q and with buffer size b if it satisfies the three properties specified previously—liveness, consistency and order-preservation. Hereinafter, the subscripts Q and b may be dropped from the equations when it is clear from the context.

If the input at time t matches the filter, then the scheme can eventually output this element by some time $t' \geq t$ in a way that the relative order of output elements is the same as that of the corresponding input elements. For the difference of time $t'-t$, the input element resides in the memory buffer used by the scheme, and upon being produced in the output stream, the element gets removed from the memory buffer. The discussion herein will focus on how the scheme uses the buffer on different elements to produce the output stream, rather than the entire operation of first decrypting the element, checking if it matches the filter and re-encrypting it if an output can be produced. Thus, the scheme may play the role of modifying the temporal spacing between the positive elements in the input stream.

Leakage of Streaming Schemes

The leakage of a filtering scheme quantitatively measures how much information about the input stream is inferred by the adversary upon observing the system output for some time. It can be assumed that the adversary is aware of the scheme deployed by the system and knows the length of the input that has been consumed by the system at the time it starts making inferences.

In some implementations, when an adversary observes an output sequence, the number of possible input sequences which could have produced that output given the knowledge of the scheme and the buffer size is large so that the probability that the adversary makes a correct guess may be negligible. This information-theoretic security concerns itself with prefixes of the input stream instead of the individual elements. Let $\mathcal{L}(\mathcal{A}, b, \sigma, n)$ denote the stream-level leakage of scheme $\mathcal{A}$, given the buffer size b, the prior joint distribution a of the adversary's belief about the input stream, and the length n of the input stream consumed by the system. For clarity, some parameters may be dropped from this notation hereinafter when they are clear from the context.

Let $\mathcal{I}_{n,n}$ be the set of all input sequences of length n that the system can receive as input. The adversary's prior belief is that $\mathcal{I}_{n,n}$ is sampled from distribution $\sigma$, so that the information it currently has is given by $H(\mathcal{I}_{n,n})$, which measures the entropy of $\mathcal{I}_{n,n}$. Let O be the output produced by scheme $\mathcal{A}$. Given the knowledge of $\mathcal{A}$ and b, the conditional entropy $H(\mathcal{I}_{n,n}|O)$ measures how much information the adversary now has about the input stream that the system actually encountered. The leakage $\mathcal{L}(\mathcal{A}, b, \sigma, n)$, given the output O, is then computed as the difference of these two entropies, which may correspond to the bits of information leaked to the adversary:

$$\mathcal{L}(\mathcal{A}, b, \sigma, n|O) = H(\mathcal{I}_{n,n}) - H(\mathcal{I}_{n,n}|O)$$

An exact computation (or even closed-form bounds) can be non-trivial to compute for even simple schemes. Thus, an objective can be to optimize on the expected leakage, where the expectation is taken over the space of possible output sequences that the system can produce:

$$\mathbb{E}(\mathcal{L}(\mathcal{A}, b, \sigma, n)) = \mathbb{E}_O(\mathcal{L}(\mathcal{A}, b, \sigma, n|O))$$

The following section characterizes oblivious streaming algorithms that allow a small value of the expected leakage.

Analysis of Filtering Algorithms

In this section, four different schemes are presented and their expected (asymptotic) leakage is analyzed. These schemes are organized in an incremental manner so that the later schemes have a lower leakage (wherever possible) than the previous. Unless specified otherwise, all inputs can be assumed to arrive in an i.i.d. (independent and identically distributed) manner with the likelihood of each element matching the filter being $p=\frac{1}{2}$ (this model is denoted by $\sigma_{1/2}$). The analysis will show a lower bound on the leakage of any algorithm that obliviously filters data streams.

A. Evict-Upon-Match Scheme (EUM)

First, a simple scheme is discussed in which the system keeps adding matched input elements to the buffer until full, and then each time an input element is matched, the system evicts the oldest element from the buffer and then adds the currently matched element to the buffer. This scheme is referred to as Evict-Upon-Match Scheme and is denoted by $EUM_b$, where b is the size of the buffer used by the system. The following pseudocode presents this scheme.

Evict-Upon-Match:

For t=1, 2 . . . :

1. If the buffer is full, evict the oldest element in the buffer to the output stream.

2. Add the input event to the buffer only if it matches the filter.

It can be shown that this scheme may have a high leakage to the adversary, because every time an eviction happens, the adversary learns that a matched element may have arrived, causing the adversary to learn full information about all the elements that arrive once the buffer is full.

Let $t_1$ be the first time when the adversary observes an output, and ignore (for the moment) all $t > t_1$. The adversary may learn the following at $t=t_1$. From the first step, an output is produced only when the buffer is full and another input element matched the filter. Thus, the adversary immediately learns that: (1) the element that arrived at time $t_1$ may have matched the filter—this is the maximum information the adversary can learn about any element in this model; (2) exactly b elements in up to time $t_1-1$ may have matched the filter—the adversary believes that each of the $t_1-1 \choose b$ choices are equally likely; and (3) for all elements that arrive after time $t_1$, the matched elements cause evictions while the unmatched ones don't (there is a one-one correspondence between whether an input element matches vs. when the eviction happens).

For b<n, the leakage of $EUM_b$ is $$1 - \Omega\left(\frac{b - \log b}{n}\right)$$

bits of information per element, with high probability in n.

To calculate the stream leakage of $EUM_b$ under $\sigma_{1/2}$:

$$\mathcal{L}(EUM_b, \sigma_{1/2}, n) = n - \log_2 t_1 - 1_b \geq$$
$$n - \log_2 t_1 - 1_{(t_1-1)/2} \geq$$
$$n - \log_2 t_{1t_1/2}$$
$$= n - t_1 + \Omega(\log t_1)$$

In the last step above, $\log n_{n/2} = n - \Omega(\log n)$ can be used. In the $\sigma_{1/2}$ model, $t_1$ represents a random variable that presents the length of the input sequence that ends in a positive element and contains b+1 positive elements total. With high probability in n, this implies $t_1 \leq 2b + O(\sqrt{b})$, implying that with high probability, $\mathcal{L}(EUM_b, \sigma_{1/2}, n) = n - \Omega(b - \log b)$.

Observe that b=n minimizes this leakage, in which case $\mathcal{L}(EUM_{\Theta(n)}, \sigma_{1/2}, n) = \Omega(\log n)$ can be obtained. When b=o(n), then $\mathcal{L}(EUM_{O(n)}, \sigma_{1/2}, n) = \Omega(n)$, implying that any buffer size (strictly) smaller than any (constant) fraction of the total length of the exposed output sequence will leak at least a constant fraction of bits of information to the adversary when EUM is deployed by the system.

B. Evict-when-Full Scheme (EWF)

Next, a scheme will be discussed in which it is not the case that every element that arrives after the first eviction is completely exposed (with respect to whether it matches the filter) to the adversary. This may be performed by emptying the buffer every time an eviction happens. This scheme is referred to as Evict-when-Full Scheme, or $EWF_b$ in short, where b is the size of the buffer deployed. The following describes the different steps in this scheme.

Evict-when-Full:

For t=1, 2 ... :

1. If the buffer is full, output all the events in the buffer and empty the buffer.
2. Add the input event to the buffer only if it matches the filter.

The scheme is analyzed for the case when $1 \leq b < n$ (the case when $b \geq n$ is trivial since no output is observed by the adversary in this case). Let $t_1, \ldots, t_k$ be the times when the adversary observes the outputs. Since the outputs are produced only when the buffer is full and only positive events are stored in the buffer, each output contains b events. However, this immediately leaks to the adversary that the input at times $t=t_1, \ldots, t_k$ may have been positive (or else an output would have not been produced at these times)—but not necessarily the inputs between these times (unlike EUM). For ease of notation, let $t_0=0$. In the $\sigma_{1/2}$ model, the following result then holds with high probability in n. $\mathcal{L}(EWF_b)$ may be used as a shorthand for $\mathcal{L}(EWF_b, \sigma_{1/2}, n)$.

For b<n, the leakage of $EWF_b$ is $$\Omega\left(\frac{\log n}{n}\right) + \Theta(1/b)$$

bits of information per element, with high probability in n. To prove this, observe that the leakage function can be written as $\mathcal{L}(EWF_b) = n - \log_2 \prod_{i=1}^{k} t_i - t_{i-1} - 1_{b-1}$ This is because any of the b-1 elements could have matched in the times between successive evictions are observed. Using the fact that for $n \neq 0$, it holds that $$n - 1_{k-1} = \frac{k}{n} n_k,$$

the following is obtained:

$$\mathcal{L}(EWF_b) = n - \log_2 \prod_{i=1}^{k} t_i - t_{i-1} - 1_{b-1}$$
$$= n - \sum_{i=1}^{k} \log_2 t_i - t_{i-1} - 1_{b-1}$$
$$= n - \sum_{i=1}^{k} \log_2 \left(\frac{b}{t_i - t_{i-1}}\right) t_i - t_{i-1_b}$$
$$= n - \sum_{i=1}^{k} \log_2 \left(\frac{b}{t_i - t_{i-1}}\right) - \log_2 \prod_{i=1}^{k} t_i - t_{i-1_b}$$

The following lemmas can be used to further simplify the expression above.

Lemma 1: For every n, n', k≥0, if n≥n' then $n_k \geq n'_k$. Assume n=n'+r for some integer r≥0. Using $n_k = n - 1_k + n - 1_{k-1}$, it can be verified that $n_k = n'_k + \Sigma_{j=n}^{n-1} j_{k-1} \geq n'_k$, since combinatorials are always non-negative.

Lemma 2: For every a, b, c, d≥0, $a_b c_d \leq a + c_{b+d}$. The proof directly follows from Chu-Vandermonde identity, from which it holds that $a + c_{b+d} = \Sigma_{k=0}^{b+d} a_k c_{b+d-k}$. Separating the term with k=b and using the fact that each of the remaining terms is non-negative, the desired result can be obtained.

Lemma 3: For any b<n, it holds that $\log_2 \Pi_{i=1}^{k} t_i - t_{i-1_b} \leq n - \Omega(\log n)$. From Lemma 2:

$$\log_2 \prod_{i=1}^{k} t_i - t_{i-1_b} \leq \log_2 \sum_{i=1}^{k} (t_i - t_{i-1})_{kb} = \log_2 t_{k_b}.$$

Now, from Lemma 1, since $t_k \leq n$, $\log_2 t_{k_b} \leq \log_2 n_{kb}$ is obtained. The lemma then follows from $n_{kb} \leq n_{n/2}$ and $\log_2 n_{n/2} = n - \Omega(\log n)$.

Observe that using Lemma 3, the leakage of $EWF_b$ can be bound as follows:

$$\mathcal{L}(EWF_b) \geq \Omega(\log n) + \sum_{i=1}^{k} \log_2\left(\frac{t_i - t_{i-1}}{b}\right) \geq \Omega(\log n) + k' \log_2\left(1 + \frac{1}{b}\right)$$

where k' is the number of rounds in which at least one negative element arrived in the input stream. In the $\sigma_{1/2}$ model, with high probability, $$k' \geq \frac{n}{2b},$$

implying that with high probability, $$\mathcal{L}(EWF_b) \geq \Omega(\log n) + (1 + o(1))\left(\frac{n}{2b}\right).$$

Corollary 1: The Evict-When-Full Scheme leaks $$\Omega\left(\frac{\log n}{n}\right)$$

bits of information per element to the adversary for any choice of the buffer size. In particular, when a buffer of constant size is used, the leakage is $\Theta(1)$ per element. A buffer size that balances leakage is $b=\tilde{\Theta}(\sqrt{n})$, which comes from the observation that $\mathcal{L}(\text{EWF}_{\tilde{O}(\sqrt{n})})=\tilde{\Theta}(\sqrt{n})$. (Here, the $\tilde{O}$ notation hides log factors.)

The analysis above indicates that a large buffer provides low leakage. The largest buffer possible is b=n, in which case, $\mathcal{L}(\text{EWF}_n)=\Omega(\log n)$. This holds true for any $b=\Omega(n/\log n)$. However, this may be too big of a buffer to deploy in practice. A constant sized buffer on the other hand leaks $\Omega(n)$ bits of information, which is of the same order as the leakage of $\text{EUM}_{o(n)}$.

Thus, EWF can provide asymptotically lower leakage than EUM discussed earlier for the same buffer size. Intuitively, this is because instead of keeping the buffer full at all times after enough positive elements were encountered, the EWF scheme empties the buffer every time it reaches capacity and hence, essentially, starts all over again with the elements that now arrive, reducing correlation (if any) with the previously seen elements. However, the reduced leakage is still vulnerable to small buffer sizes, in which case the leakage is asymptotically no better than the prior scheme.

C. Collect-and-Evict Scheme (CE)

Building upon the idea discussed above, a scheme similar to EWF will be discussed, except that it adds all tuples to the buffer and not just the ones that match the filter. This change to the scheme, which will be referred to as the Collect-and-Evict Scheme, or $CE_b$ in short for buffer of size b≤n, helps in further lowering the asymptotic worst case leakage. The following pseudocode summarizes the main steps in this scheme.

Collect-and-Evict:
For t=1, 2 . . . :
1. If the buffer is full, output all the matched events in the buffer and empty the buffer.
2. Add the input event to the buffer (independent of whether it matches or not).

Observe that $CE_b$ produces an output every b time steps—this uniformity in producing outputs helps in reducing the leakage since the variance in eviction times (as seen above) can be a source of high leakage. Let the output produced at time t=kb for k≥1 be denoted as $c_k$. For simplicity, assume that n is a multiple of b. This implies that a total of n/b outputs are known to the adversary at the time it guessed the distribution of matches in the input stream which was incident to the system up to time n. We will use $\mathcal{L}(CE_b)$ as a shorthand for $\mathcal{L}(CE_b, \sigma_{1/2}, n)$. Let $t_0=0$.

For b≤n, the leakage of $$CE_b \text{ is } \Theta\left(\frac{\log b}{b}\right) \text{bits}$$

of information per element, with high probability in n. Since $c_i$ outputs are observed at time $t_i$, the stream leakage of $CE_b$ can be computed as $$\mathcal{L}(CE_b) = n - \log_2 \prod_{i=1}^{n/b} b_{c_i}.$$

simplifying this, the following is obtained:

$$\mathcal{L}(CE_b) = n - \sum_{i=1}^{n/b} \log_2 b_{c_i} \geq n - \sum_{i=1}^{n/b} \log_2 b_{b/2} = n - \frac{n}{b}(b - \Omega(\log b)) = \Omega\left(\frac{n}{b}\log b\right).$$

Finally, using the fact that $$\sum_{k=0}^{n} n_k \log_2 n_k > (n - \log_2 n)2^n \text{ for } n \geq 3,$$

$$\mathcal{L}(CE_b) = O\left(\frac{n}{b}\log b\right)$$

is obtained.

Note that the this establishes a tight bound on the leakage as opposed to only a lower bound for the previous schemes. This implies that the Collect-and-Evict scheme may always leak $$\Theta\left(\frac{n}{b}\log b\right)$$

bits of information for any choice of the buffer size. Similar to EWF, the corollary below follows.

Corollary 2: For sufficiently large n, the scheme $CE_b$ with $b=\tilde{\Theta}(\sqrt{n})$ leaks $\tilde{\Theta}(1/\sqrt{n})$ bits of information per element, with high probability in n. Solve $$b = \Theta\left(\frac{n}{b}\log b\right)$$

to obtain $b=\Theta(\sqrt{n}\log\log n)$.

It is observed that when b<n, then the Collect-and-Evict scheme has an asymptotically lower leakage than Evict-when-Full scheme. This follows directly from the fact that $$\Theta\left(\frac{n}{b}\log b\right) < \Omega(\log n) + \Theta(n/b)$$

when $b=O(n)$. However, as b/n increases, the leakage of the two schemes becomes nearly the same, whereas when b/n is low, the Collect-and-Evict scheme has much lower leakage. As discussed in further detail below, it is shown that $CE_b$ is has asymptotically optimal leakage for all schemes that filter streams in the model according to embodiments of the invention.

D. Randomized Collect-and-Evict Scheme (URCE)

So far, schemes that are fully deterministic have been discussed in the sense that the system makes no random choices while processing the input stream. A scheme that randomizes times to evict and the number of elements to evict is analyzed to determine that it may not be possible to achieve lower leakage than what $CE_b$ produces. This scheme is referred to as Randomized Collect-and-Evict Scheme, and is denoted by $URCE_b$ when a buffer of size b is deployed. As is commonly assumed, the adversary is oblivious to the random coin flips made by the algorithm, however, here it may be assumed that the adversary knows the probability with which eviction happens and the randomized process through which the number of elements to evict is chosen.

The following pseudocode presents the steps according to some embodiments in this scheme:

Randomized Collect-and-Evict:
For t=1, 2 . . . :
1. With probability $p_e$, choose a (uniformly) random number of oldest elements from the buffer and evict them to the output stream.
2. Add the input element to the buffer if it matches the filter. If the buffer is full before this addition, evict a (uniformly) random number of oldest elements from the buffer first and then add the input element to the buffer.

Next, some properties of the stochastic process induced by this scheme to infer what the information leakage to the adversary is will be discussed. For a given discrete random variable X on the positive integers, let U(X) denote a uniform random variable in $\{1, \ldots, X\}$.

Lemma 4: $\mathbb{E}(U(X))=(\mathbb{E}(X)+1)/2$. For a positive integer i, let $p_i \geq 0$ denote the probability that X takes the value i. Then, the following is obtained:

$$\mathbb{E}(U(X)) = \sum_{k=1}^{\infty} k Pr(U(X) = k)$$

$$= \sum_{k=1}^{\infty} \sum_{n=k}^{\infty} \frac{k p_n}{n} = \sum_{n=1}^{\infty} \sum_{k=1}^{n} \frac{k p_n}{n} = \sum_{n=1}^{\infty} \frac{(n+1) p_n}{2}$$

$$= (\mathbb{E}(X) + 1)/2$$

First, the expected buffer size at any given time can be determined. This information is potentially a source of leakage for the adversary.

Fix the buffer size b and let p be the probability with which an input element matches the filter (identically and independently of others). For $t \geq 1$, let $X_t(p)=1$ with probability p and 0 otherwise. Let $B_t$ denote the buffer size at time i. Let $B_0=0$. Then, for $t \geq 0$, $$B_{t+1} = B_t + X_t(p) - Y_t$$

where $Y_t = X_t(p_e) \cdot U(B_t)$ if $B_t < b$ and $U(B_t)$ otherwise. When $B_t < b$, the following is obtained (using linearity of expectation and Lemma 4):

$$\mathbb{E}(B_{t+1}) = \mathbb{E}(B_t + X_t(p) - X_t(p_e) \cdot U(B_t))$$

$$= \mathbb{E}(B_t) + p - p_e(\mathbb{E}(B_t) + 1)/2$$

$$= \left(1 - \frac{p_e}{2}\right) \mathbb{E}(B_t) + \left(p - \frac{p_e}{2}\right)$$

Solving this recurrence with $B_0=0$ gives $$\mathbb{E}(B_{t+1}) = \sum_{i=0}^{t} \left(1 - \frac{p_e}{2}\right)^i \left(p - \frac{p_e}{2}\right) < \frac{2p}{p_e} - 1.$$

Observe that if $$p_e > \frac{4p}{b+2},$$

then the expected buffer size never increases beyond b/2. Hence, from now on, $$p_e = \frac{10}{b+2}$$

can be set, for which may require b>2. This might cause some forced evictions (with negligible probability), but the buffer can be augmented with an arbitrarily large unprotected memory so that reasonable values of $p_e$ can be set without increasing the leakage. The plot in FIG. 4 for b=100 for n=$10^7$ time steps shows that in practice, this choice of $p_e$ does not force evictions with high probability.

Figure 4:
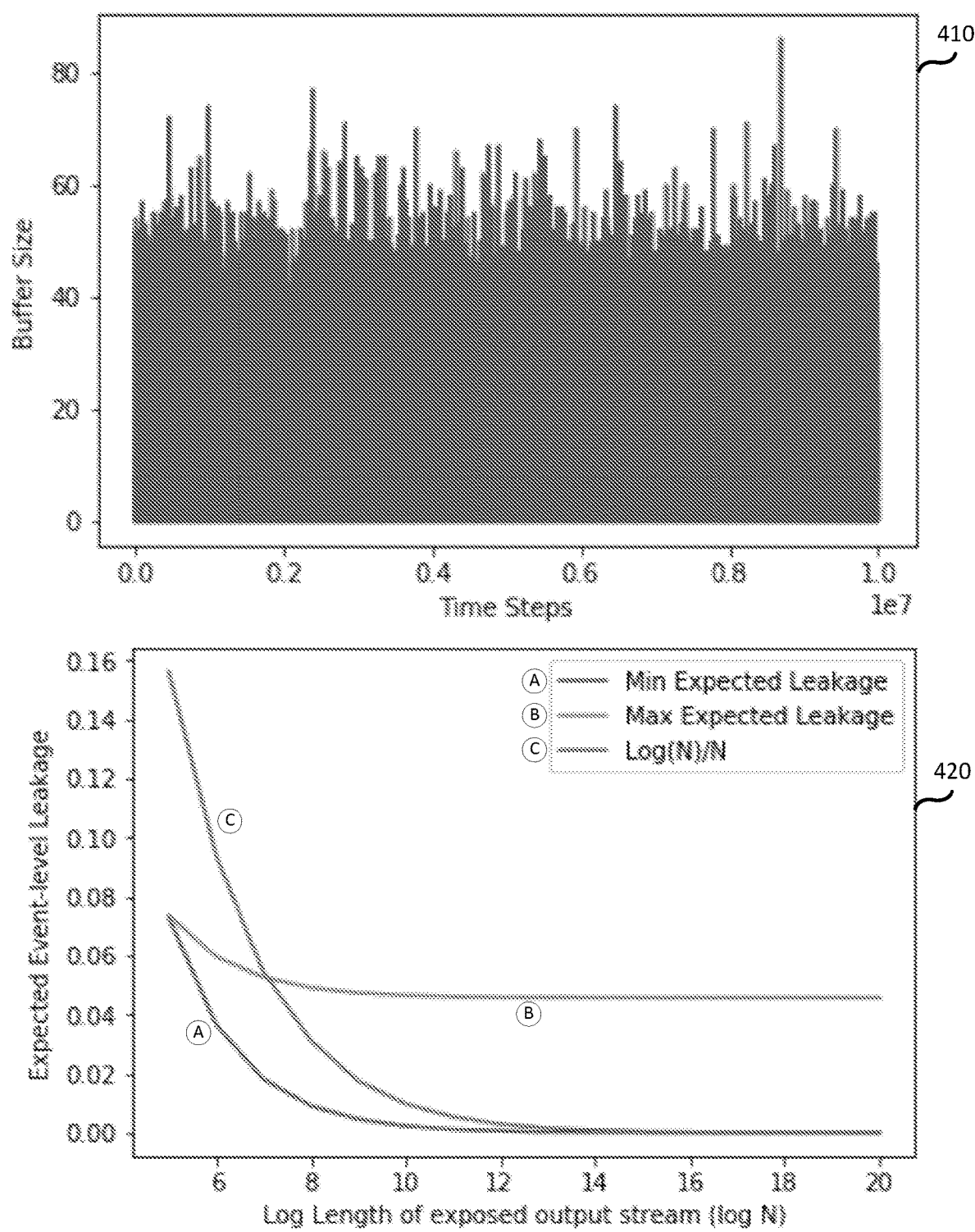
FIG. 4 shows plots of the buffer size and expected element-level leakage, according to some embodiments.

FIG. 4 illustrates plots for the buffer size and expected (amortized) element-level leakage for the $URCE_b$ scheme with b=100. Plot 410 shows the buffer size for $URCE_b$ with b=100, p=0.5 and $p_e=10/(b+2)$, indicating that with high probability, forced evictions do not happen with this choice of the eviction probability, $p_e$. Plot 420 shows the expected leakage (per-element) of $URCE_b$ with b=100 when the adversary observes that a single output is produced at the end of n time steps.

Let $M_t$ denote the random variable for the number of outputs observed by the adversary at $t^{th}$ time step. Under the assumption that $B_t$ stays below the maximum buffer size b until time t, $M_t = X_i(p_e) \cdot U(B_i)$, where $p_e=10/(b+2)$. The following can then be obtained:

$$\mathbb{E}(M_t) = \mathbb{E}(X_i(p_e) \cdot U(B_i)) = p_e \mathbb{E}(U(B_i)) = \frac{p_e}{2}(\mathbb{E}(B_i) + 1).$$

This gives the following expression for the expected number of outputs:

$$\mathbb{E}(M_t) = \frac{5}{b+2}\left(1 + \sum_{i=0}^{t}\left(\frac{b}{b+2}\right)^i\left(p - \frac{2}{b+2}\right)\right) < p < 1$$

Having computed the expected buffer size and the expected number of observed outputs, the leakage can be computed when then the adversary observes the first output. Consider the positive element that is input to the system at time t. To compute the probability that it is output at time t'=t+k for $k \geq 1$ (assuming the buffer doesn't get full in this time), the buffer size at time t' is considered.

Note that this element gets evicted at time t'=t+1 with probability $$p_e\left(\frac{B_{t+1} - B_t + 1}{B_{t+1}}\right) = p_e\left(1 - \frac{B_t - 1}{B_{t+1}}\right)$$

(since at least $B_t$ evictions can happen). Suppose the system produces only $k \geq 1$ outputs at time $t=n \geq 2$.

Let $In_t$ denote the element that the system received the first input at time t and $Out_{k,t}$ denote the element that k outputs were produced at time t. Then, $Pr(Out_{1,t_2}|In_{t_1}) = p_e(1-p_e)^{t_2-t_1-1}$. Using Bayes' rule, the following can be obtained:

$$Pr(In_{t_1} | Out_{1,t_2}) = \frac{Pr(Out_{1,t_2} | In_{t_1}) Pr(In_{t_1})}{Pr(Out_{1,t_2})}$$

-continued $$= \frac{p_e(1-p_e)^{t_2-t_1-1}(1-p)^{t_1-1}p}{\sum_{t_1=1}^{t_2-1} p_e(1-p_e)^{t_2-t_1-1}(1-p)^{t_1-1}p}$$

$$= \frac{\left(\frac{1-p}{1-p_e}\right)^{t_1}}{\sum_{t_1=1}^{t_2-1}\left(\frac{1-p}{1-p_e}\right)^{t_1}}$$

Furthermore, let $\varepsilon_t$ be the element that the adversary believes that the input at time t matches the filter. Clearly, $\Pr(\varepsilon_t)=p$. For $\Pr(\varepsilon_t|\text{Out}_{1,n})$, the property that $\Pr(A|B)=\Pr(AC|B)\Pr(C)+\Pr(\overline{AC}|B)\Pr(\overline{C})$ with $C=\text{In}_t$ can be used. Thus, the following is obtained:

$$\Pr(\varepsilon_t | \text{Out}_{1,n}) = \Pr(\text{In}_t | \text{Out}_{1,n})\Pr(\text{In}_t) +$$

$$\Pr(\varepsilon_t \wedge \overline{\text{In}_t} | \text{Out}_{1,n})\Pr(\overline{\text{In}_t})$$

$$= \frac{\left(\frac{1-p}{1-p_e}\right)^t}{\sum_{i=1}^{n-1}\left(\frac{1-p}{1-p_e}\right)^i}(1-p)^{t-1}p +$$

$$p^2\sum_{i=1}^{t-1}(1-p)^{i-1} \geq$$

$$p\left(p(2-p) + \frac{1}{2}\left(\frac{(1-p)^2}{1-p_e}\right)^{t-1}\right)$$

The stream leakage for the adversary upon observing one output at time $t_2=n$ can be computed as follows:

$$\mathcal{L}(URCE_b) =$$

$$nH(p) - \sum_{t=1}^{n-1} H(\Pr(\varepsilon_t | \text{Out}_{1,n})) \leq nH(p) - \sum_{t=1}^{n-1} H(p(p(2-p)+\alpha))$$

where, $$\alpha = \frac{1}{2}\left(\frac{(1-p)^2}{1-p_e}\right)^{t-1}.$$

Also, $\Pr(\varepsilon_t|\text{Out}_{1,n})$ is at most $$p\left(1+\left(\frac{1-p}{1-p_e}\right)^{t-1}\right),$$

which implies the following:

$$\mathcal{L}(URCE_b) \geq nH(p) - \sum_{t=1}^{n-1} H\left(p\left(1+\left(\frac{1-p}{1-p_e}\right)^{t-1}\right)\right).$$

For $p=\frac{1}{2}$ and $p_e=10/(b+2)$, $$\mathcal{L}(URCE_b) \leq n - \sum_{t=1}^{n-1} H\left(\frac{3}{8} + \frac{1}{4}\left(\frac{b+2}{4(b-8)}\right)^{t-1}\right)$$

and $$\mathcal{L}(URCE_b) \geq n - \sum_{t=1}^{n-1} H\left(\frac{1}{2} + \frac{1}{2}\left(\frac{b+2}{2(b-8)}\right)^{t-1}\right).$$

The plot in FIG. 4 depicts per-element bounds for $N \leq 2^{20}$ and max buffer size 100. Observe that both the upper and lower bounds are asymptotically similar to the green plot, which is log n/n. This indicates that the expected leakage per element upon observing only one output is the same order as log n/n. Any further observations will only leak more information (if any), which indicates that $URCE_b$ is unable to circumvent the tight bound on the leakage as was observed for Collect-and-Evict. This implies that a randomized algorithm is unable to help any further than a fully deterministic scheme when it comes to the amount of information inferred by the adversary. Hence, Collect-and-Evict may be the optimal oblivious filtering algorithm, according to some embodiments.

Leakage from Exposing the Output Stream

In this section, a lower bound on the leakage of any algorithm for oblivious filtering given a buffer size $b \leq n$ is discussed. It can be shown that in the threat model, any oblivious filtering algorithm may leak $\Omega(\log b/b)$ bits of information per element. Throughout this discussion, assume that the input distribution is $\sigma_{1/2}$. A general approach is to show that for a fixed buffer size, the leakage of any algorithm is at least the leakage of the algorithm that only produces outputs at the end of every b time steps, similar to $CE_b$.

For any scheme $\mathcal{A}$, the leakage to the adversary can be minimized when all the outputs are produced at the end of n time steps. A buffer of size n can be assumed here. Let $\mathcal{A}$ produce outputs $c_1, \ldots, c_k$ at time steps $t_1 < \ldots < t_k \leq n$, so that $\Sigma_{i=1}^{k} c_i \leq n$ and each $c_i \geq 1$. For notational purposes, let $t_0=0$. Since $\mathcal{A}$ cannot produce more outputs than the total number of positive tuples seen so far, it can be the case that $c_i \leq t_i$ for each i.

Upon observing these outputs, suppose the adversary infers that the input stream contains $m_j$ positive tuples from $t=t_{j-1}+1$ to $t=t_j$, where $\Sigma_j c_j \leq \Sigma_j m_j$ for all j (the equality holds for j=k). Then, the leakage to the adversary is given as $$\mathcal{L}(\mathcal{A}, b, \sigma_{1/2}, n) = n - \log_2 \prod_{i=1}^{k} t_i - t_{i-1_{m_i}}.$$

Using Lemmas 1 and 2 and the fact that $n_k$ is maximized at $k=n/2$, this expression can be simplified as follows:

$$\mathcal{L}(\mathcal{A}, b, \sigma_{1/2}, n) \geq n - \log_2 \sum_{i=1}^{k}(t_i - t_{i-1}) \sum_{i=1}^{k} m_i =$$

$$n - \log_2 t_k \sum_{i=1}^{k} m_i \geq n - \log_2 n \sum_{i=1}^{k} m_i \geq n - \log_2 n_{n/2} = \Omega(\log n)$$

When b<n, no more than b elements can be stored in the buffer at any time. Thus, the outputs can be produced at most b time steps apart. In each of these sequences of b time steps, the analysis above shows that the minimum leakage is when all the outputs for these time steps are produced at once at the end of b time steps. The leakage here is $\Omega(\log b)$. Finally, since all inputs arrive independent of (and identically to) each other, the leakage for n time steps is the sum of the leakage of these slots of b time steps each, which equals $\Omega((n/b)\log b)$. Averaging over all elements, the minimum leakage per element is $\Omega(\log b/b)$ bits of information, amortized.

Controlling Delays During Filtering

In this section, the delay introduced by the different filtering schemes will be analyzed. For applications that are delay-critical, for example, video streaming, it can be preferable that the oblivious filtering operation does not introduce large delays so as to render the service unusable. There is a tradeoff between how frequently the adversary can observe the outputs without being able to infer much about the input stream. In this regard, suppose the maximum delay for any positive tuple in the input stream is at most $\Delta \geq 0$. The implication for the buffer size and leakage will be discussed below. Also, if the buffer size is fixed the minimum leakage given b and $\Delta$ will be determined. It can be assumed that each input independently matches the filter with (constant) probability p>0.

First the Evict-Upon-Match scheme will be discussed. Recall that this algorithm can produce an output every time the buffer is full and evicts only the matched element from the buffer. The expected time before the buffer is full for the first time is b/p, after which, in expectation, a positive element arrives every 1/p time steps. Thus, any element experiences a delay of b/p−1 time steps in expectation, since it gets evicted the moment it is the oldest element in the buffer. To tolerate a given $\Delta$, this implies using b=p($\Delta$+1). Independent of the choice of b and $\Delta$, the leakage of this scheme is $\Omega(1)$ bits of information per element.

For the Evict-When-Full scheme, recall that the eviction happens when the buffer is full, at which time the buffer contents are flushed out. Thus, for an element arriving at time t, we write t=Qb+R, where $Q=\lfloor t/b \rfloor$ and $R=t-b\lfloor t/b \rfloor$. At this time, the buffer contains in expectation $pR=p(t-b\lfloor t/b \rfloor)$ so far. Hence, the buffer can hold up to $b-pR=b-p(t-b\lfloor t/b \rfloor)$ more elements before it is full, implying that the delay introduced by this element is $$\frac{b - p(t - b\lfloor t/b \rfloor)}{p} = \frac{b}{p} - (t - b\lfloor t/b \rfloor)$$

time steps. This delay is maximum (=b/p) when t is a multiple of b and the least when t=(b/p)−1. To tolerate $\Delta$ in the worst case, b=p$\Delta$. This gives a leakage of $\Omega(\log n/n) + \Theta(1/\Delta)$ bits of information per element.

For the Collect-and-Evict scheme, outputs are produced every b time steps and elements are added to the buffer independent of whether they match the filter or not. Thus, for an element arriving at time t=Qb+R, where $Q=\lfloor t/b \rfloor$ and $R=t-b\lfloor t/b \rfloor$, the buffer will be full after $b-R=b-(t-b\lfloor t/b \rfloor)$ time steps, which is, thus, the delay experienced by this element. Note that this delay is independent of p. The maximum value of this delay is b, implying that to tolerate $\Delta$, we can have b=$\Delta$. This implies a leakage of $$\Theta\left(\frac{1}{\Delta}\log\Delta\right)$$

bits of information per element.

Finally, for the Randomized-Collect-and-Evict scheme, recall that the eviction process is probabilistic, where in each time step, a random number of elements are evicted from the buffer with probability $p_e$. Setting the value of $p_e$ appropriately so that the buffer does not overflow (with high probability), at time t, the expected buffer size is $$\mathbb{E}(B_t) = \sum_{i=0}^{t-1}\left(1 - \frac{p_e}{2}\right)^i\left(p - \frac{p_e}{2}\right).$$

Since the buffer contains only matched elements, the delay introduced by the element that arrives at time t is the same as the time it takes for at least $\mathbb{E}(B_t)$ evictions to take place. The expected number of outputs produced at time t is at most p. Hence, it takes at least $\mathbb{E}(B_t)/p$ time steps of delay. Moreover, since every eviction causes at least 1 element to evict, the maximum delay for the element at time t is $\mathbb{E}(B_t)/p_e < 3p/p_e^2$. Setting $$p_e = \frac{10}{b+2},$$

the maximum expected delay is $3p(b+2)^2/100$. Thus, to tolerate $\Delta$, we need $b=\Omega(\sqrt{\Delta})$. From the lower bound, we know that the leakage in this case is $$\Omega\left(\frac{1}{\sqrt{\Delta}}\log\Delta\right)$$

bits of information per element.

ORAM-Assisted Use of Unprotected Memory

The lower bound discussed above provides that the Collect-and-Evict scheme may have the optimal leakage in the threat model, given a buffer size. However, from Corollary 2, there is a tradeoff between the buffer size and the length of the input stream processed to the extent that a low leakage comes at the cost of potentially very large buffer sizes. The algorithms discussed so far have assumed that the buffer is a trusted memory module, which makes it impractical in reality to offer low leakage since side-channel free trusted memories can be expensive and an overkill if used just for filtering purposes.

In this section, an optimization of the Collect-and-Evict scheme from will be discussed. An oblivious-RAM (ORAM) is used to substitute large trusted memory with unprotected memory. The construction, according to some embodiments, makes the size of the trusted memory only a function of the size of elements in the input stream and independent of how many input elements need to be processed. Since unprotected memory is easily available and lower cost, the leakage can be made arbitrarily close to the lower bound, depending mainly on the constraints on the latency of the system. The details of the construction are as follows.

Let τ be the size of an encrypted element from the input stream and B, M be the size (in bits) of the trusted and unprotected memory (ORAM), respectively and T be the number of time steps after which eviction happens. It can be assumed that the ORAM is organized as T+1 blocks of length E(τ+1) bits each, where E(x) is the size of the encrypted x-bit string. Block 0 is to store the dummy element and the remaining are to store the (encrypted) elements from the input stream. For each block, the (τ+1)-bit string which is encrypted consists of 1 indicator bit and the remaining τ bits correspond to the contents of the input string. Without loss of generality, it can be assumed that the $0^{τ+1}$ string does not appear in the input stream and hence, the ORAM consists of Enc(0||$0^τ$) in each block (fresh encryption for each block) at the time of initialization.

Figure 5:
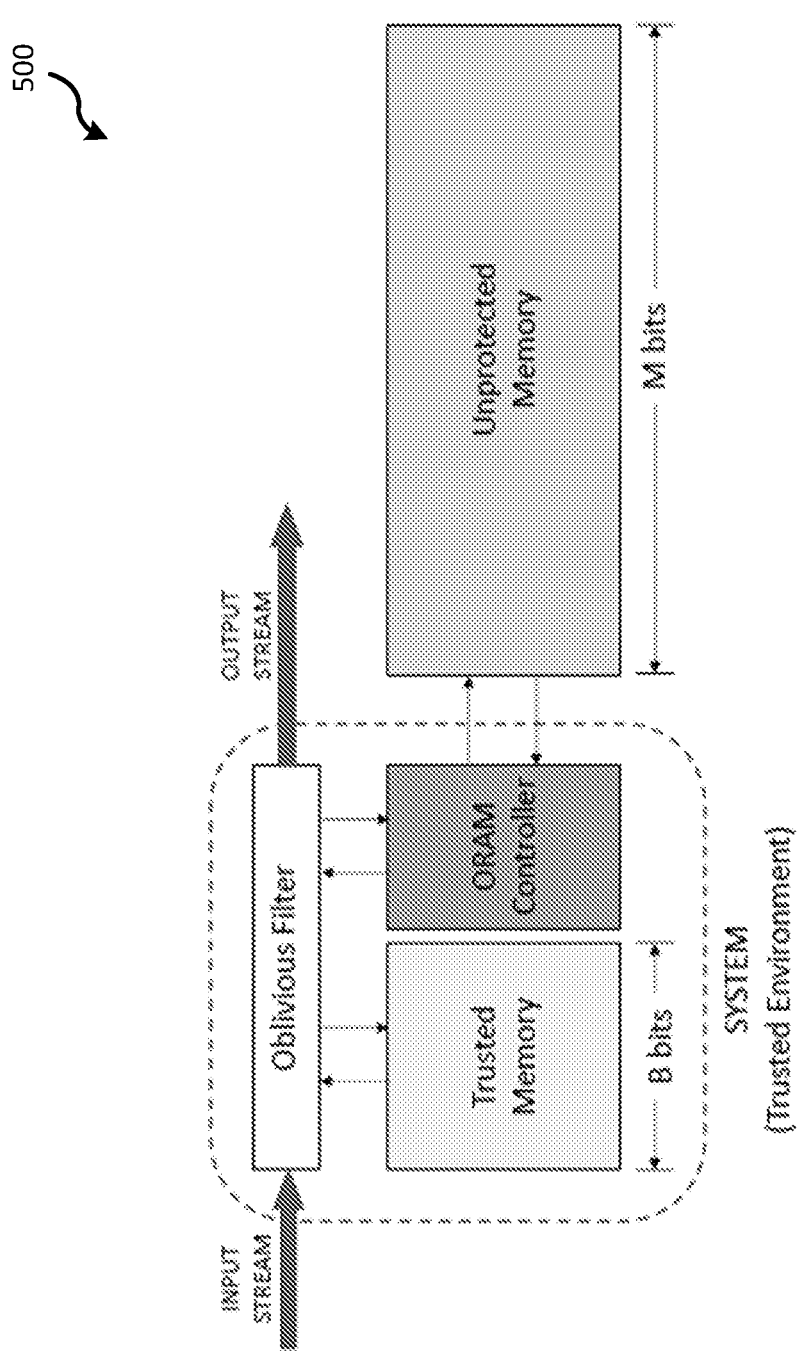
FIG. 5 shows a system model for an oblivious random access memory (ORAM) assisted filtering algorithm, according to some embodiments.

FIG. 5 illustrates a system 500 for the ORAM assisted oblivious filtering algorithm, according to some embodiments. The algorithm may proceed as follows: for each input element, a write is issued to the ORAM. If the input element matches the filter, the input element is written to the ORAM, else a dummy write is issued. This hides information about which type of element (positive or negative) is written to the ORAM. The dummy element is always written to location 0 of the ORAM and the $i^{th}$ positive element is written to location i. The indicator bit on these elements is set to 1 (for a positive element e, the string written to the ORAM is Enc(1||e)). This goes on for T time steps, after which the eviction process is triggered.

In the eviction process, the system can read one element at a time from the ORAM, starting from location 1, and continues doing this until an element with the indicator bit 0 is read. For each element that is read, the system also writes Enc(0||$0^τ$) to the ORAM in the corresponding location. Once the element is in the trusted memory, it is re-encrypted and produced in the output stream. This way, when the eviction process ends, the ORAM is set back to its initial state (except with fresh encryptions for all zeroes).

Although the algorithm above may appear to be similar to the Collect-and-Evict scheme, note that eviction is not happening after B time steps, but after T time steps. The leakage of this algorithm is, thus $$\Theta\left(\frac{n}{T}\log T\right),$$

with an expected delay of O(T) time steps for each element (the delay introduced by the ORAM can be made o(T) by using recursive Path-ORAM). The trusted buffer can handle processing input elements and outputs in parallel, however, it needs to store a counter for where in the unprotected memory the next element can be stored. Thus, this algorithm may use only B=2 max{(τ+1), E(τ+1)}+log(T/τ)=Θ(log(T/τ)) bits of protected memory if a recursive Path-ORAM is used, and M=(T+1)E(τ+1)=Θ(Tτ) bits. This implies that the size of the trusted memory is independent of the length of the stream and only a function of how large individual elements in the stream are and log the size of the unprotected memory. For applications that are not delay sensitive, T can be chosen according to how much M and B can be afforded. Otherwise, based on the maximum affordable delay, T can be set to this delay.

If w-window order preservation (order preservation across windows but not necessarily within) is allowed, then we only need a trusted memory of size at most $$\Theta\left(\log\frac{M}{w\tau}\right).$$

This implies that tor a stream containing a million positive elements of 1 Mb size each, the trusted memory has reduced from 1 Tb (as used to store all elements in the trusted memory) to about 3 Mb, which is about 6 orders of magnitude smaller. Combine this with the unit reduction in delay for every unit reduction in the buffer size, this implies almost $10^5$ times faster outputs.

Trading Bandwidth Efficiency for Leakage

In the algorithms discussed above, the output stream contains only those elements that matched the filter in the system, and hence, full bandwidth-efficiency (with respect to the number of extra elements in the output stream) is maintained. Part of the fact that the lower bound is non-trivial is because of this restriction. However, adding some dummy elements to the output stream may not reduce the leakage while keeping the same buffer size. Adding even one dummy element to the output stream may increase the leakage to the adversary in the threat model. Note that adding dummy elements may require another filtering at the application end where the output stream is consumed, however, this filtering is far more trivial than the oblivious filtering task considered here. The easiest way to perform this filtering would be to decrypt the elements: the dummy elements will not decrypt to anything meaningful while the elements that do correspond to the positive elements from the input stream.

Assuming that the adversary cannot distinguish encrypted matched elements with dummy elements, an algorithm $\mathcal{A}$ is (ε,m)-bandwidth efficient for ε∈[0,1] if any given output stream O contains at most εm dummy elements, where m is the number of unmatched elements in the input stream that produced O.

As an example, consider the basic scheme which adds a dummy element for each unmatched element in the input stream. Note that this scheme achieves zero leakage since the adversary observes an output at every time step and has no way to distinguish a real output from a dummy output. Moreover, the trusted buffer only needs to be able to hold a single element in this case (for decryption and checking if the element matches the filter), and thus, this algorithm may use b=Θ(τ) bits only. However, ε=1 for this scheme, which makes it highly bandwidth inefficient.

To understand the effect of adding dummy elements to the output, consider the variant of Collect-and-Evict scheme in which each time the eviction happens, if the buffer contains m unmatched elements, then the number of outputs produced is b−m+εm=b−m(1−ε). Thus, assuming the adversary knows ε<1, then upon observing k outputs, the adversary's guess for m is (b−k)/(1—ε), causing the leakage to be b−$\log_2$ $b_{(b−k)/(1−ε)}$>0. Using a tighter analysis (averaging over possible values of m when p=½), it can be shown that the expected leakage of this scheme is $$\Omega\left(\log\frac{b(2-ε)}{bε+2-ε}\right).$$

Hence, any ε<1 causes a non-zero leakage to the adversary. Based on the application, if ε needs to be bounded (for example, network applications), then the leakage becomes a function of this bandwidth efficiency. On a side note, this result also suggests that using an ε fraction of dummy packets has leakage (asymptotically) similar to using a (larger) buffer of size $b(2-\varepsilon)/(2-\varepsilon-\varepsilon b)$, where in the latter case no bandwidth blowup takes place.

Filtering on Multiplexed Streams

The techniques described herein can also multiplex multiple input streams and perform filtering in a way that the output elements do not reveal what input stream they came from. In a multiplexed input, the element that arrives at each time step is an m-tuple, where m is the number of different (independent, and potentially, with different prior distributions) streams that are multiplexed. Assuming all these streams are honestly generated and have no adversarial influence on them, the system essentially treats this input as m different inputs that arrive at (finer) time steps spaced 1/m units apart.

For applications that do not depend on the relative order of these m inputs, the system can simply shuffle the outputs corresponding to these inputs and produce them in the output stream in a manner that the scheme specifies. The shuffling operation happens inside the trusted module and hence, the adversary is unable to correlate the outputs produced with their membership to some given input stream (any better than a random guess). A technical caveat here is to ensure that the finer time steps in the input stream do not cause the outputs to be immediately produced, rather, the system processes inputs in epochs, where in each epoch all m inputs are processed at the same time and the outputs are first shuffled and then stored in the buffer (if so). With this, the leakage of the system on an m-multiplexed input stream is no more than m times the leakage of the single stream (since m times more inputs are now processed).

For applications that may need the output stream to respect the relative positions of the multiplexed streams, one solution is to insert dummy elements for the streams that do not contain as many positive elements as required. This will help reduce the leakage of the system at the cost of bandwidth efficiency—often in privacy-preserving settings, there is a strict tradeoff between redundancy and leakage.

Exemplary Methods

Figure 6:
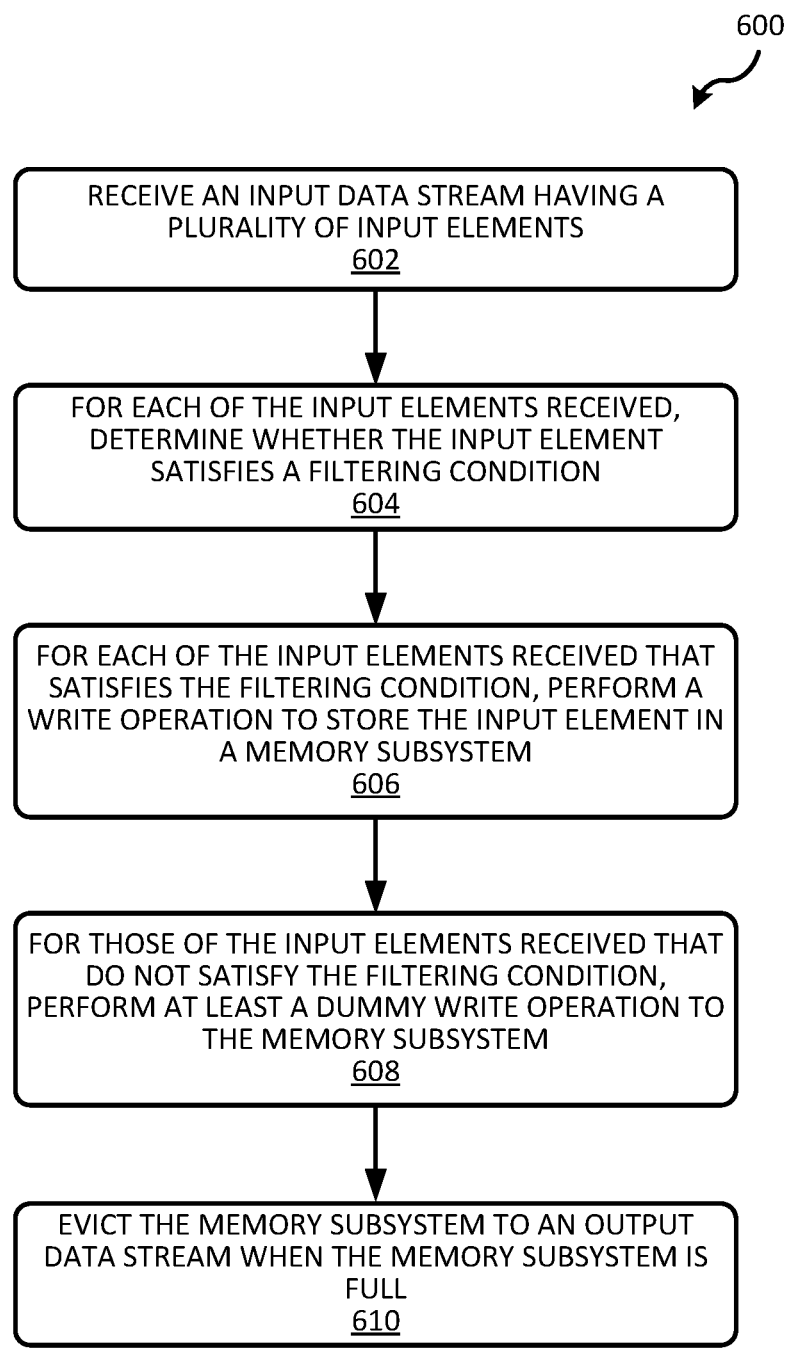
FIG. 6 shows a process for oblivious filtering, according to some embodiments.

FIG. 6 illustrates a process 600 for oblivious filtering, according to some embodiments. Process 600 can be performed, for example, by a filter device such as a computing device that performs a data filtering function. The filter device may include a memory subsystem that is used as a buffer between the input and output data streams, and the memory system may include both a trusted memory and an unprotected memory. The unprotected memory may have a bigger memory size that the trusted memory, and the size of the trusted memory may depend on the length of the input elements, and a logarithmic of the size of the unprotected memory.

At block 602, an input data stream having multiple input elements are received. The input elements can be, for example, network packets, database entries, media content, etc. In some implementations, the input elements can be received according to a periodic time interval, where one input element is received at each time interval. In some embodiments, the input data stream and be a multiplexed data stream in which input elements for different intended consumers are interleaved with each other.

At block 604, for each of the input elements received, a determination is made as to whether the input element satisfies a filtering condition. In some implementations, the data input element can be parsed, and logic or computational operations can be performed on the data input element to determine if the data input element satisfies the filtering condition. Examples of a filtering condition may include determining if a network packet is intended for a particular destination, if a database entry satisfies a database query, if one or more parameters of the input data satisfy certain thresholds, if an integrity check of the input data element verifies that the input data element has no errors, if a user is authorized to access the data input element, etc. In some embodiments, the filtering condition can be programmable or configurable. In some embodiments, the filtering condition can be hardcoded.

At block 606, for each of the input elements received that satisfies the filtering condition, a write operation is performed to store the input element in the memory subsystem. The write operation may include concatenating a positive indicator bit (e.g., a binary 1 bit) with the input element that satisfies the filtering condition, encrypting a result of the concatenating, and storing the encrypted result in the memory subsystem. The input element that satisfies the filtering condition can be written to the trusted memory or to the unprotected memory. In some embodiments, if the order of the input elements needs to be maintained at the output, the locations or memory addresses in the memory subsystem can be written in order such that the trusted memory is filled up first and then the unprotected memory is filled, or vice versa.

At block 608, for those of the input elements received that do not satisfy the filtering condition, a dummy write operation is performed on the memory subsystem. In some implementations, a dummy write operation can be performed for each input element that fails the filtering condition. In such implementations, the total number of writes including both actual write operations and dummy write operations would be equal to the total number of input elements received. The dummy write operation may include concatenating a negative indicator bit (e.g., a binary 0 bit) with a data string (e.g., a string of zeros) having a same length as an input element, encrypting a result of the concatenating, and storing the encrypted result in the memory subsystem. The dummy write operations may all write to a designated location in the memory subsystem such as address 0 of the memory subsystem. Depending on how the system maps addresses to the memory subsystem, address 0 may correspond to the trusted memory or to the unprotected memory.

At block 610, when the memory subsystem is full, the memory subsystem is evicted to provide the contents to the output data stream. For example, each address of the memory subsystem except for the designated address of the dummy writes can be read out and be provided to the output data stream. In some implementations in which the dummy writes are written elsewhere, only the data elements read out from the memory subsystem that have a positive indicator bit are provided to the output data stream. Furthermore, the indicator bit can be removed from the data element before being outputted onto the output data stream. In some embodiments, other modifications (e.g., decryption, re-encryption, insertion of headers, compression, formatting or format translation, etc.) can be performed on the data element before sending it to the data consumer.

The various entities or components described herein may be associated with or operate one or more computer apparatuses to facilitate the functions described herein. Some of the entities or components, including any server or database, may use any suitable number of subsystems to facilitate the functions. Examples of such subsystems or components can be interconnected via a system bus. Additional subsystems may include a printer, keyboard, fixed disk (or other memory comprising computer readable media), monitor, which can be coupled to display adapter, and others. Peripherals and input/output (I/O) devices, which couple to an I/O controller (which can be a processor or other suitable controller), can be connected to the computer system, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium.

It should be understood that the techniques as described above can be implemented in the form of control logic using computer software (stored in a tangible physical medium) in a modular or integrated manner. Based on the disclosure and teachings provided herein, a person of ordinary skill in the art will know and appreciate other ways and/or methods to implement the techniques using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   receiving, by a computing device, an input data stream having a plurality of input elements;
   for each of the input elements received, determining whether the input element satisfies a filtering condition;
   for each of the input elements received that satisfies the filtering condition, performing a write operation to store the input element in a memory subsystem;
   for those of the input elements received that do not satisfy the filtering condition, performing at least a dummy write operation to the memory subsystem; and
   evicting the memory subsystem to an output data stream when the memory subsystem is full.

2. The method of claim 1, wherein the write operation includes concatenating a positive indicator bit with the input element.

3. The method of claim 2, wherein the write operation further includes encrypting a result of the concatenating, and storing the encrypted result in the memory subsystem.

4. The method of claim 1, wherein a dummy write operation is performed for each of the input elements received that does not satisfy the filtering condition.

5. The method of claim 4, wherein the dummy write operation includes encrypting a result of the concatenating, and storing the encrypted result in the memory subsystem.

6. The method of claim 4, wherein the data string is a string of zeros.

7. The method of claim 1, wherein the dummy write operation includes concatenating a negative indicator bit with a data string having a same length as an input element.

8. The method of claim 1, wherein the memory subsystem includes a trusted memory and an unprotected memory.

9. The method of claim 8, wherein at least one of the input elements that satisfies the filtering condition is stored in the trusted memory.

10. The method of claim 8, wherein at least one of the input elements that satisfies the filtering condition is stored in the unprotected memory.

11. The method of claim 8, wherein the dummy write operation writes to a designated location in the memory subsystem.

12. A method comprising:
    receiving, by a computing device, a first input element of an input data stream having a plurality of input elements;
    determining that the first input element satisfies a filtering condition;
    performing a write operation to store the first input element in a memory subsystem;
    receiving a second input element of the input data stream;
    determining that the second input element fails the filtering condition;
    performing a dummy write operation to a designated location in an unprotected memory of the memory subsystem; and
    evicting the memory subsystem to an output data stream when the memory subsystem is full.

13. The method of claim 12, wherein the first input element is stored in a trusted memory of the memory subsystem, and wherein the second input element is stored in the unprotected memory of the memory subsystem, the trusted memory having a size that is dependent on a length of the input elements of the input data stream, and a logarithmic of a size of the unprotected memory.

14. A computing system comprising:
a memory subsystem;
a processor; and
a non-transitory computer readable storage medium storing code, which when executed by the processor, cause the processor to perform operations including:
  receiving an input data stream having a plurality of input elements;
  for each of the input elements received, determining whether the input element satisfies a filtering condition;
  for each of the input elements received that satisfies the filtering condition, performing a write operation to store the input element in the memory subsystem;
  for those of the input elements received that do not satisfy the filtering condition, performing at least a dummy write operation to the memory subsystem; and
  evicting the memory subsystem to an output data stream when the memory subsystem is full.

15. The computing system of claim 14, wherein the write operation includes concatenating an positive indicator bit with the input element, encrypting a result of the concatenating, and storing the encrypted result in the memory subsystem.

16. The computing system of claim 14, wherein a dummy write operation is performed for each of the input elements received that does not satisfy the filtering condition.

17. The computing system of claim 14, wherein the dummy write operation includes concatenating a negative indicator bit with a data string having a same length as an input element, encrypting a result of the concatenating, and storing the encrypted result in the memory subsystem.

18. The computing system of claim 14, wherein the memory subsystem includes a trusted memory and a unprotected memory.

19. The computing system of claim 18, wherein the dummy write operation writes to a designated location in the memory subsystem.

20. The computing system of claim 18, wherein the trusted memory is of a size that is dependent on a length of the input element, and a logarithmic of a size of the unprotected memory.

* * * * *